United States Patent [19]
Neder

[11] 3,951,244
[45] Apr. 20, 1976

[54] CLUTCH RELEASE BEARINGS

[75] Inventor: Günter Neder, Schweinfurt, Germany

[73] Assignee: SKF Industrial Trading and Development Company, B.V., Amsterdam, Netherlands

[22] Filed: Oct. 15, 1973

[21] Appl. No.: 406,231

[30] Foreign Application Priority Data
Oct. 18, 1972 Germany.......................... 38171[U]

[52] U.S. Cl. .............................................. 192/98
[51] Int. Cl.² ........................................ F16D 23/00
[58] Field of Search ......................... 192/98, 110 B

[56] References Cited
UNITED STATES PATENTS

| | | | |
|---|---|---|---|
| 2,030,813 | 2/1936 | Dolza | 192/110 B |
| 2,725,965 | 12/1955 | Binder | 192/98 |
| 3,105,579 | 10/1963 | Moore et al. | 192/98 X |
| 3,604,545 | 9/1971 | Bourgeois | 192/98 |
| 3,815,715 | 6/1974 | Maucher | 192/110 B X |
| 3,882,979 | 5/1975 | Limbacher et al. | 192/110 B X |
| 3,900,091 | 8/1975 | Maucher | 192/110 B X |

FOREIGN PATENTS OR APPLICATIONS

| | | |
|---|---|---|
| 1,234,423 | 6/1971 | United Kingdom.................. 192/98 |
| 726,358 | 3/1955 | United Kingdom.................. 192/98 |

Primary Examiner—Samuel Scott
Assistant Examiner—Lance W. Chandler
Attorney, Agent, or Firm—Murray Schaffer

[57] ABSTRACT

A clutch release bearing mounted about a slidable clutch actuating sleeve. The clutch release bearing comprises an inner race ring rotatable about the sleeve, a plurality of roller means, and an outer race ring. The outer race ring is mounted so as normally to be non-rotatable, by an annular dish-like washer secured to the sleeve and having radially extending spokes, the outer ends of which enter into an annular groove formed in the inner surface of the outer ring. The outer ends of the spokes are normally held securely by frictional fit within the groove but are flexed so as to disengage from one surface of the groove under axial actuation of the bearing to thereby permit the bearing as a whole to be self centerable about the central longitudinal axis of the sleeve.

8 Claims, 4 Drawing Figures

CLUTCH RELEASE BEARINGS

RELATED CASE

The present application is related to co-pending application of the common assignee Ser. No. 405,404 filed Oct. 23, 1973 corresponding to German Pat. No. P 22 50 455.8 filed on Oct. 14, 1972 in the name of Horst Ernst et al. Should the present disclosure require amplification or additional material, the same may be obtained from this case, the disclosure of which is incorporated herein, as if more fully set forth.

BACKGROUND OF INVENTION

The present invention relates to a combination of a clutch actuating sleeve and a clutch release bearing mounted thereon and in particular to a system of mounting said clutch release bearing so as to be self-centering with respect to the clutch release lever and the sleeve.

Clutch release bearings comprising an inner race ring and an outer race ring, between which are ranged a plurality of roller means, are generally mounted about the actuating sleeve so that the inner race ring revolves freely while the outer ring is fixed against rotation to the actuating sleeve. It has been known from German Pat. No. 1,775,412 to mount the clutch release bearing so that it is permitted to radially shift in every direction about the sleeve. The bearing, however, because of the fixing of the outer race ring to the sleeve is at best movable only in frictional engagement with the sleeve and is provided with a resilient or elastically resilient spring washer which acts only in the axial direction.

It is the object of the present invention to provide an improved combination of clutch release bearing and actuating sleeve which is simple and is formed of few parts.

It is another object of the present invention to provide a combination of a clutch release bearing and actuating sleeve by which the clutch bearing is freely self-centering during operational engagement with the clutch release levers.

It is a further object of the present invention to provide a self centering release bearing in which several functions such as the fixing of the outer race ring and the self centering mechanism are taken over by a few components.

These objects, other objects, and numerous advantages will be apparent from the following disclosure of the present invention.

SUMMARY OF THE INVENTION

According to the present invention a clutch release bearing is mounted about a slidable clutch actuating sleeve. The clutch release bearing comprises an inner race ring rotatable about the sleeve, a plurality of roller means, and an outer race ring normally fixed against rotation with respect to the sleeve. The means for mounting the outer race ring comprises an annular dish — a dish-like washer secured to the sleeve and having radially extending spokes. The outer ends of the spokes enter into an annular groove formed in the inner surface of the outer ring adjacent one end. The outer ends of the spokes are normally held securely by frictional fit within the groove but are flexed so as to disengage from one surface of the groove under axial actuation of the bearing to thereby permit the bearing as a whole to be self centerable about the central longitudinal axis of the sleeve.

Preferably the radially extending spokes are in the form of flat tongues supported in slidable frictional engagement on both their flat sides. This may be obtained by machining the inner bore of the outer race ring with an annular shoulder and by covering the end of the outer ring with an annular disk which is secured to the outer ring. Preferably the annular disk has a curved shape conforming to the curve of the spokes of the washer spring. By matching the outline of the disk to that of the spring washer a large surface of contact may be obtained so that a reliable frictional mounting between the two is furnished.

It is also preferable that the spring washer be in the nature of a belleville spring having its spokes radiating uniformly spaced about its annular ring-like center. The ring like center is preferably slit radially so that the washer may be manipulated and snapped easily about the sleeve.

Full details of the present invention are given in the following disclosure of its preferred embodiments and are illustrated with the accompanying drawings.

DESCRIPTION OF INVENTION

Figure 1:
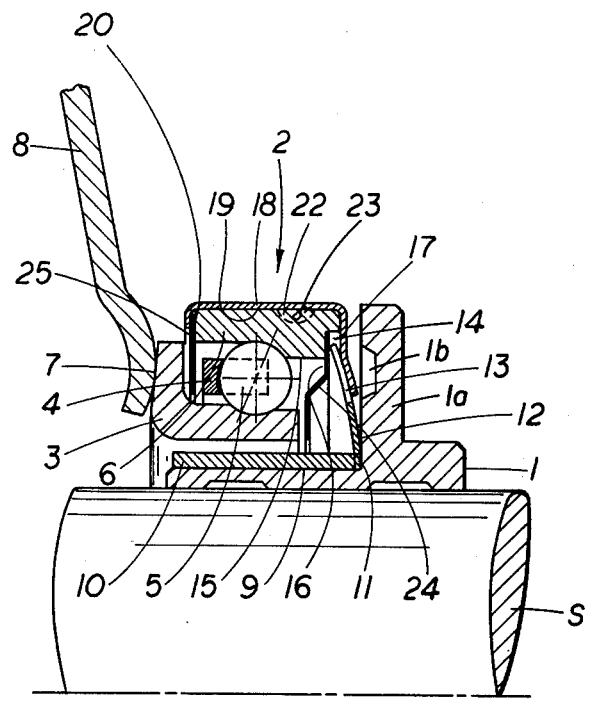
FIG. 1 is a sectional view of a clutch release bearing and actuating sleeve according to the present invention mounted about an actuating shaft.

As seen in FIG. 1 the present invention is embodied in the combination of a slidable actuating sleeve 1 and a clutch release bearing generally depicted by the numeral 2. The actuating sleeve is T-shaped in cross section and has an annular radially extending flange 1a and is slidably fixed about an actuating shaft S. The bearing 2 comprises an inner race ring 3, adapted to be freely rotatable about the central axis of the sleeve 1, a cage 4 in which a plurality of roller bodies 5 such as ball bearings are held and an outer race ring 6. Abutting against the frontal end face 7 of the inner race ring 3 are the curved ends of a clutch release lever 8 which is also made in the form of a belleville spring cut or punched to have a plurality of radially inwardly extending levers 8.

Fixed on the outer surface 9 of the sleeve 1, facing the inner ring 3, is a casing or band 10 made of plastic or similar material of generally unyielding strength. The band or casing 10 is secured in any known manner to the surface 9. Wedged between one end of the casing 10 and the flange 1a of the sleeve is the inner edge 11 of an annular dish shaped spring washer 12. The washer 12 is in the form of a belleville spring and is cut or stamped to have a plurality of radiating flat finger or tongue like spokes 13 uniformly spaced radially from the inner edge 11. The inner edge 11 is in a continuous form and the spokes 13 extend integrally from it. The outer ends of the spokes 13 enter within a groove 14, formed on the inner surface 15 of the outer race ring, adjacent its one end nearest the flange 1a. The groove 14 is formed by machining the inner surface 15 of the outer race ring with an open shoulder 16 which shoulder is covered by a rigid disk 17 made for example from sheet metal, plastic or the like. The disk 17 lies against the outer surface of the spokes 13 and preferably has a curvature conforming thereto.

In the form seen in FIG. 1, the disk 17 is in fact an integral part of a cap 18. The cap 18 is secured to the outer surface 19 of the outer ring and is bent over the axial ends 20 and 21 of the ring so that it snaps easily into place. In another embodiment the disk 17 (or the cap 18) may be secured to the outer ring by forming the outer race ring with an annular groove 22 and the disk 17 (or the cap 18) with a mating lug 23 as indicated in the dotted lines of FIG. 1. A sealing disk 24 is arranged between the spring washer 12 and the shoulder 16. A second sealing disk 25 is arranged at the opposite end between the bent potion of the cap 18 and its opposing shoulder 20.

Figure 2:
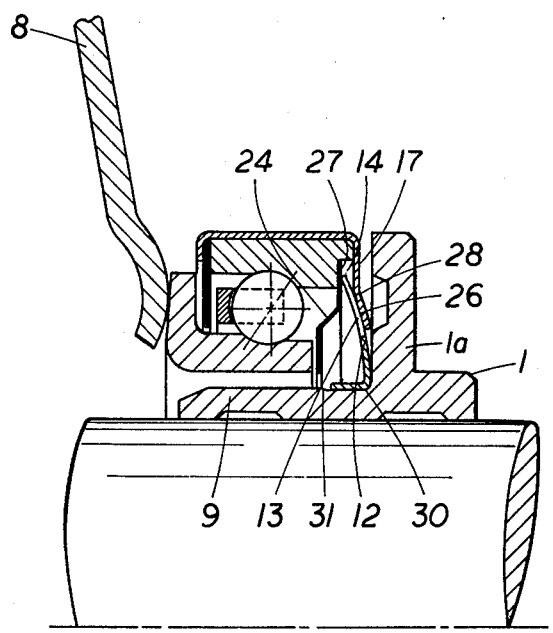
FIG. 2 is a view similar to that of FIG. 1 showing a modified form of the present invention wherein the bearing is depicted in the normal state of arrest.
Figure 3:
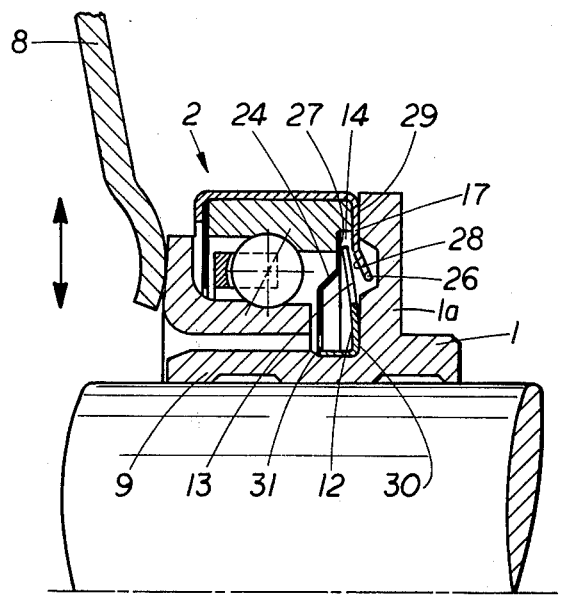
FIG. 3 is a view of the embodiment shown in FIG. 2 wherein the bearing is in its operational state.

The operation of the arrangement is clearly seen in FIGS. 2 and 3 in which the combination of parts is largely the same as that shown in FIG. 1. It will be noted that the spokes 13 are inclined at an angle inwardly toward the bearing 2, so that they exert an axial component of force on the end of the outer race ring 6. The radially inner edge of the disk 17 is inclined outwardly at an incline to the end 21 of the outer race ring, toward the flange 1a. The flange 1a is provided with an annular cut-out 1b to accommodate the end of the disk 17. The spokes 13 while being flat are curved in the form of the belleville spring inwardly toward the outer race ring 6. The bearing as seen in FIG. 2 is representative of a position both before and after the centering operation is accomplished. In this position the spokes 13 are supported by both the surfaces 27 and 28 of the shoulder 16 and the curved portion of the disk 17, respectively. The flat spokes 13 thus have a frictionally slidable fit with both the surfaces 27 and 28 which holds the bearing in its proper given position during this normal rest position. During the centering operation seen in FIG. 3, the actuation of the sleeve 1 moves the flange 1a into engagement with the frontal surface 29 of the disk 17 so as to consequently move the bearing toward the clutch release levers 8 so that good power transmission is obtained. The spokes 13, normally curved inwardly toward the shoulder 16, are consequently flexed so that they no longer engage the curved edge of the disk 17 and ride loosely about the surface of the seal member 24 or the surface of the shoulder 16. As a result the frictional contact between the spokes 13 and the bearing 2 is reduced, permitting the bearing 2 to be freely movable radially about the sleeve 1. Thus the bearing may freely shift following the forces exerted by interaction of the clutch release levers 8 and the inner ring 3 moving radially as indicated by the double arrow seen in FIG. 3. Upon completion of the operation the bearing returns to the position seen in FIG. 2.

FIGS. 2 and 3 illustrate a further embodiment of the spring washer 12. In this embodiment, the spring washer is formed with an inner edge 30 bent inwardly in a band extending axially along the surface of the sleeve 1. The band edge 30 sits within a groove 31 formed in the surface 9 of the sleeve 1. The groove 31 and the band edge 30 are of the same axial length so that the spring washer 12 will not move axially. This avoids the use of a separate retaining member such as the casing band 10 seen in FIG. 1.

Figure 4:
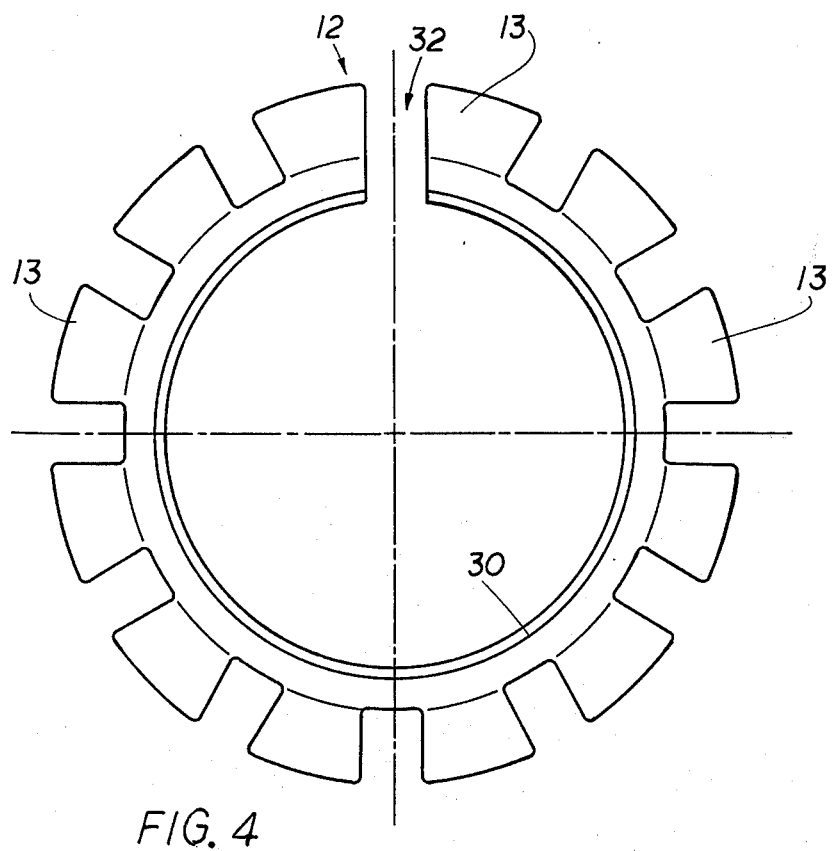
FIG. 4 shows a plan view of a dish-shaped washer employed in the embodiment of FIGS. 2 and 3.

The spring washer 12 used in FIGS. 2 and 3 is shown in greater detail in the plan view of FIG. 4. As seen in FIG. 4, the washer 12 comprises a solid continuous ring band 30 about one edge of which are integrally formed a plurality of spaced tongue like spokes 13. The spokes 13 are flat and extend outwardly in a uniform curvature in the form of a belleville spring. Preferably the number of such spokes 13 are in even integers although this is not absolutely necessary to obtain a uniform distribution about the longitudinal axis of the sleeve. The ring 30 is split radially as at 32 so that it may be easily sprung and snapped into position within the groove 31 as seen in FIGS. 2 and 3.

It will be obvious from the foregoing that the present invention provides a simple means for self centering the clutch release bearing. The spring washer formed in the nature of a belleville spring having a plurality of radially extending spokes provides a uniform force distribution about the periphery of the outer race ring. Through the double support of the outer ends of the spokes 13, by the opposing action of the shoulder 16 and the disk 17 on the inner and outer surfaces of the spokes, the clutch bearing is held securely in frictional fit in its centered position during its rest periods. During the centering operation however the movement of the sleeve flexes the belleville spring washer so that the ends of the spokes 13 rest with only one edge on the surface 16. In this manner the radial shifting of the bearing is made extremely easy. The spring washer moreover attaches the bearing onto the sliding sleeve and prevents it from rotating about the axis of the sleeve. Thus the normally used sheet metal caps in which the bearing is encased are not necessary in the use of the present invention.

Forming the groove in which the spokes 13 are received by merely machining an annular shoulder in the inner surface of the outer race ring and by providing an overlapping cover disk 17, the construction is greatly simplified and the number of parts reduced. As seen the curvature of the tongues 13 is such that the end of the tongues extend toward the outer race ring. The curvature of the disk 17 conforms thereto but is inclined in an opposite direction. This matching of the curvature ensures a large frictional contact between the two in the normal rest position and ensures separation of these parts during the actuation and self-centering operation.

The form of the belleville spring type washer shown in FIG. 4 is advantageous in that it enables the washer to be easily placed into position and moreover easily removed so as to be replaced should it break or its spring rate be reduced.

Various modifications have been shown, others will be obvious to those skilled in the present art. The present disclosure is to be taken as illustrative only and not limiting of the scope of the present invention.

What is claimed is:

1. The combination of a sliding clutch actuating sleeve and a selfcentering clutch release bearing having an inner race ring rotatable about said sleeve, a plurality of roller means and an outer race ring, and means fixing said outer race ring with respect to said sleeve comprising an annular groove formed on the inner surface of said outer race ring adjacent one end thereof, and an annular dish-like spring washer secured to said sleeve and having a plurality of spokes radially extending with their outer ends resiliently within said annular groove.

2. The combination according to claim 1 wherein said spokes are resiliently curved inwardly toward said bearing to frictionally engage the opposite surfaces of said groove.

3. The combination according to claim 1 wherein said groove is formed by an annular shoulder formed in the inner surface of said outer ring and an annular disk covering the frontal end of said outer ring and attached thereto.

4. The combination according to claim 3 wherein said disk comprises an integral portion of a retaining cap secured about said outer ring.

5. The combination according to claim 3 wherein the radially inner end of said disk is inclined at an angle to the end of said outer ring.

6. The combination according to claim 5 wherein the radially inner end of said disk is curved conformingly to the curve of said spokes.

7. The combination according to claim 1 wherein said washer is provided with a radial split permitting the same to be distended about said sleeve.

8. The combination according to claim 1 wherein said spring washer comprises a belleville spring.

* * * * *